United States Patent
Hui et al.

(10) Patent No.: US 7,623,576 B1
(45) Date of Patent: Nov. 24, 2009

(54) METHOD AND APPARATUS FOR INTERLACED/NON-INTERLACED FRAME DETERMINATION, REPEAT-FIELD IDENTIFICATION AND SCENE-CHANGE DETECTION

(75) Inventors: Yau Wei Lucas Hui, Singapore (SG); Kwong Huang Goh, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 0 days.

(21) Appl. No.: 09/914,171

(22) PCT Filed: Feb. 26, 1999

(86) PCT No.: PCT/SG99/00014

§ 371 (c)(1),
(2), (4) Date: Dec. 21, 2001

(87) PCT Pub. No.: WO00/51355

PCT Pub. Date: Aug. 31, 2000

(51) Int. Cl.
*H04N 7/18* (2006.01)
(52) U.S. Cl. .................. 375/240.26; 348/700; 348/701
(58) Field of Classification Search .................. 348/526, 348/699–702; 375/240.01–240.29
See application file for complete search history.

(56) References Cited

U.S. PATENT DOCUMENTS

| | | | | |
|---|---|---|---|---|
| 4,661,853 A * | 4/1987 | Roeder et al. | ................ | 348/701 |
| 4,723,163 A * | 2/1988 | Skinner | ................ | 348/448 |
| 5,317,398 A * | 5/1994 | Casavant et al. | ............. | 348/570 |
| 5,365,273 A | 11/1994 | Correa et al. | | |
| 5,398,071 A | 3/1995 | Gove et al. | | |
| 5,452,011 A * | 9/1995 | Martin et al. | ................ | 348/526 |
| 5,460,420 A * | 10/1995 | Perkins et al. | ............... | 293/106 |
| 5,508,750 A * | 4/1996 | Hewlett et al. | ............... | 348/558 |
| 5,521,644 A * | 5/1996 | Sezan et al. | .................. | 348/452 |
| 5,561,477 A * | 10/1996 | Polit | .......................... | 348/700 |
| 5,565,998 A | 10/1996 | Coombs et al. | | |
| 5,689,301 A | 11/1997 | Christopher et al. | | |
| 5,828,786 A * | 10/1998 | Rao et al. | .................... | 382/236 |
| 5,874,995 A * | 2/1999 | Naimpally et al. | ...... | 375/240.25 |
| 6,014,182 A * | 1/2000 | Swartz | ....................... | 348/700 |
| 6,084,641 A * | 7/2000 | Wu | .............................. | 348/722 |
| 6,157,412 A * | 12/2000 | Westerman et al. | ......... | 348/558 |
| 6,262,773 B1 * | 7/2001 | Westerman | ................. | 348/448 |
| 6,714,594 B2 * | 3/2004 | Dimitrova et al. | ....... | 375/240.16 |
| 6,934,335 B2 * | 8/2005 | Liu et al. | ................ | 375/240.16 |
| 7,068,722 B2 * | 6/2006 | Wells | .................... | 375/240.16 |
| 7,075,581 B1 * | 7/2006 | Ozgen et al. | ................ | 348/448 |
| 7,113,221 B2 * | 9/2006 | Law et al. | .................... | 348/448 |
| 7,180,548 B2 * | 2/2007 | Mishima et al. | ............. | 348/441 |

FOREIGN PATENT DOCUMENTS

WO        WO 95/15659        6/1995

* cited by examiner

*Primary Examiner*—Andy S Rao
(74) *Attorney, Agent, or Firm*—David V. Carlson; Lisa K. Jorgenson

(57) ABSTRACT

A method of processing video data to detect field characteristics of the data, said data having a plurality of fields, including the steps of: comparing first and second fields, said first field being a successive field of said second field; comparing pixel values of respective sub-blocks of said first field and a third field, said second field being a successive field of said third field; determining whether said first field is an interlaced field or a progressive field with respect to a successive field of said first field based on said steps of comparing.

20 Claims, 6 Drawing Sheets

METHOD AND APPARATUS FOR INTERLACED/NON-INTERLACED FRAME DETERMINATION, REPEAT-FIELD IDENTIFICATION AND SCENE-CHANGE DETECTION

The present invention relates to methods and apparatus for the pre-processing of moving pictures before encoding. In particular, the present invention relates to methods and apparatus for determining whether a digital picture frame is an interlaced-scan picture or a non-interlaced-scan picture; identifying a repeated-field; and detecting a scene-change in a sequence of moving pictures.

Encoding methods such as the well known MPEG-1 and MPEG-2 standards have been popularly used for efficient transmission and storage of video. An MPEG encoder compresses an input video signal picture-by-picture to produce an output signal or bitstream compliant to the relevant MPEG standard. Pre-processing techniques can be applied to the input video signal before encoding, for example, to remove noise and re-format the signal (eg. 4:2:2 to 4:2:0 conversion, image size conversion, etc.).

The input video signal is typically in an interlaced format, for example the 525/60 or 625/50 (lines/frequency) format, with each video frame consisting of two fields (top field and bottom field). However, the source material of the video signal may be originally produced on film and converted to the video signal via a telecine process. This process converts a progressive source into an interlaced format and provides at the same time, if necessary, frame rate conversion for example using a 3:2 or 2:2 pulldown technique. In the case of 24 Hz film to 525/60 Hz video conversion, each progressive film picture is converted to two interlaced video fields and, in addition, there are 12 repeated fields according to the 3:2 pulldown patterns in every second of the converted video. Improvement in coding efficiency can be obtained if the video source from film is identified and the repeated (or redundant) fields are detected and removed before coding. Pre-processing techniques applied before encoding can also gain from the results of film picture detection.

The known methods of film mode detection can be widely classified into two categories: (1) film mode detection using film-frame pattern identification; and (2) film mode detection using automatic interlace/progressive frame detection.

The output of the type of method using film-frame pattern identification is a decision whether the input sequence is an interlaced video or a 3:2/2:2 pulldown film. The detection tries to identify the unique pattern of a 3:2 or 2:2 pulldown film. One of the most commonly used techniques is to detect the repeat field pattern in the 3:2 pulldown film (as described in U.S. Pat. Nos. 5,317,398 and 5,398,071). The pixel to pixel field differences between alternate fields (fields with the same parity) are measured to identify whether the 3:2 repeat field pattern exists.

Another commonly used assumption is that the field differences between two interlaced fields is significantly greater than the field difference between two non-interlaced (or progressive) fields. One method is to group the successive fields that have the least field differences as a film frame (as described in U.S. Pat. No. 5,565,998). Another method is to measure the consecutive field differences of incoming fields and monitor the pattern to decide if it is an interlaced video, 3:2 film or 2:2 film (as described in U.S. Pat. Nos. 5,365,273 and 5,689,301). In the above methods, the unique pattern is monitored for a period (typically spanning 5 to 64 fields) before a decision is made.

With the method of film mode detection using automatic interlace/progressive frame detection, apart from deciding whether an incoming sequence is a film, this type of detection also determines if a frame is interlaced or progressive and identifies a repeated field. Due to the inclusion of the interlace/progressive detection for every frame, it does not have the slow response in interlace/progressive encoding as in the film-frame pattern identification methods described above. One of the methods used for the interlace/progressive detection, such as in U.S. Pat. No. 5,452,011, is the intra-field and inter-field difference (IIFD) comparison. The IIFD method compares the inter-field and intra-field differences to detect whether two consecutive fields are interlaced. The assumption is that the inter-field difference will be greater than the intra-field difference.

In most of the current video/film detection methods which have no automatic interlace/progressive detection, when there is a transition from interlaced video to film, the decision switching is made after a delay of a period typically spanning 5 to 64 fields. This means that the encoding of the film frames in this delay period is still done in interlace mode and redundant fields in this period are not removed before encoding. Similarly when there is a transition from film to interlaced video, the interlaced video frames in the decision switching delay period are still encoded as progressive frames.

A film sequence is often being edited, and a scene change may occur in any field. Sub-titles might also be added to any field of the film, thereby changing the 3:2 repeat-field pattern of the film so that the fames are not always progressive. Interlaced video sequences also consist of some progressive frames due to very little or no motion in between these fields. The current film detection methods which have no automatic interlace/progressive detection will not be able to detect these interlaced frames within a film and the progressive frames within the interlace video.

It is therefore an object of the present invention to address the above-mentioned problems by detecting whether a frame is interlace or progressive immediately after receiving the frame data so that the encoder can encode the frame as interlace or progressive according to the detection decision, or to at least provide a useful alternative.

For existing automatic interlace and progressive detection methods, which compare the intra-field and inter-field differences to make the detection decision, the comparison is not always accurate. The inaccuracy can be due to the inter-field difference being very small, because of little or no motion between successive frames, or to the intra-field difference being large because of very detailed texture or information within the field.

There are also inaccuracy problems in detection methods which assume that interlace difference is significantly greater than progressive difference. The problem which arises from this assumption is that when the previous field ($f_{N-1}$) and current field ($f_N$) have little or no motion, the interlaced field difference between $f_{N-1}$ and $f_N$ might not be significantly greater than the difference between the progressive fields $f_N$ and $f_{N+1}$.

The present invention is also intended to improve the accuracy of the interlace/progressive detection by making the detection decision which is not only based on the comparison between the interlace difference and the progressive difference, but also on the moving activities between successive frames. This is to check if an insignificant field difference between $f_{N-1}$ and $f_N$ is due to little motion, so as to avoid an incorrect decision due to the insignificant interlace difference.

The present invention provides a method of processing video data to detect field characteristics of the data, said data having a plurality of fields, including the steps of:
 comparing first and second fields, said first field being a successive field of said second field;
 comparing pixel values of respective sub-blocks of said first field and a third field, said second field being a successive field of said third field;
 determining whether said first field is an interlaced field or a progressive field with respect to a successive field of said first field based on said steps of comparing.

The present invention further provides an apparatus for processing video data to detect field characteristics of the data, said data having a plurality of fields, including:
 first comparison means for comparing first and second fields, said first field being a successive field of said second field;
 second comparison means for comparing pixel values of respective sub-blocks of said first field and a third field, said second field being a successive field of said third field;
 progressive/interlace decision means for determining whether said first field is an interlaced field or a progressive field with respect to a successive field of said first field based on respective outputs of said first and second comparison means.

A preferred embodiment of the present invention is described hereinafter, by way of example only, with reference to the accompanying drawings, wherein.

Figure 1:
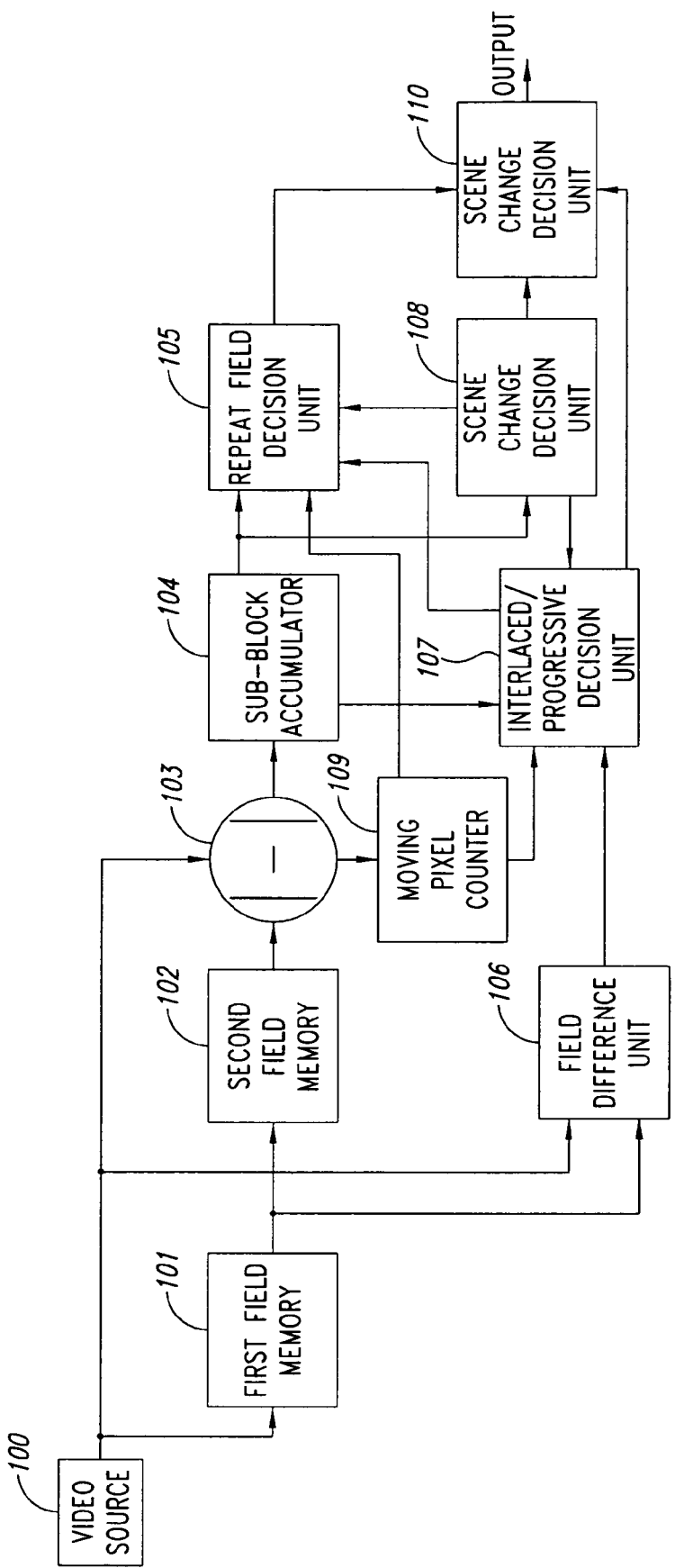
FIG. 1 is a block diagram of a system for determining interlace/non-interlace frames, identifying repeat fields and detecting scene-changes from a video source in accordance with an embodiment of the present invention.
Figure 2:
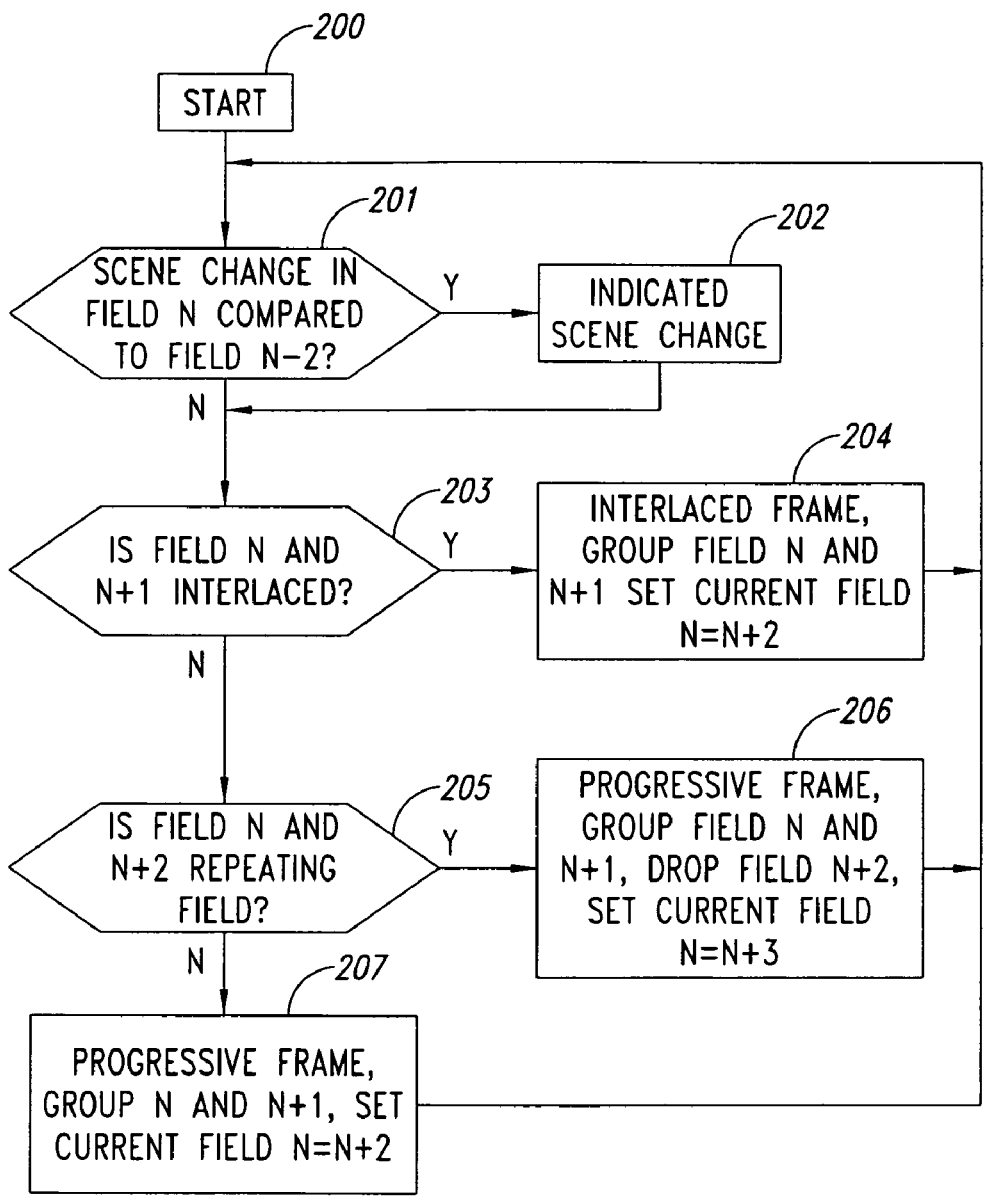
FIG. 2 is a flow diagram illustrating the field grouping decision process.

In the preferred embodiment of the present invention, only two field memory units 101 and 102 are required. Referring to FIG. 1, at a particular time, a video source 100 provides a field N to field memory 101, subtracter 103 and the consecutive field difference unit 106. At that time, the field memory 101 outputs the previous field N−1 to the second field memory 102 and to the consecutive field difference unit 106. Also at that time, the second field memory 102 outputs field N−2 to the subtracter 103. The sub-block sum of absolute differences between the pixels of the incoming fields N and N−2 (functionally expressed as SBD (N−2,N)), is measured using subtracter 103 and sub-block accumulator 104. The consecutive field difference between the current field N and the previous field N−1, (functionally expressed as CFD(N−1,N)), is measured by the consecutive field difference unit 106 and fed into an interlace/progressive decision unit 107. The value of SBD (N−2,N) is used in a scene change decision unit 108 to decide if field N is a new scene compared to field N−2. It is also used in a repeat field decision unit 105 to decide if field N is a repeat field of field N−2. The number of sub-block moving pixels between field N−2 and N (functionally expressed as moving-pixel (N−2,N)), is computed by a sub-block moving pixel counter 109, and is input to the repeat filed decision unit 105 and the interlace/progressive decision unit 107. When field N+1 arrives, CFD(N,N+1) is then measured and compared with CFD(N−1,N) in the interlace/progressive decision unit 107. The number of sub-block moving pixels, moving-pixel (N−1,N+1), is used in the interlace/progressive decision unit 107 to decide if fields N and N+1 are interlaced or progressive. The field grouping decision is made in a field grouping decision unit 110. The flow diagram relating to the field grouping decision unit 110 is shown in FIG. 2. Fields N and N+1 are grouped as an interlaced or progressive frame depending on the output of the decision unit 107. If the current field N and field N+1 are detected as being interlaced by the unit 107, then fields N and N+1 are grouped as an interlaced frame and field N+2 becomes the new current field. If fields N and N+1 are detected as being progressive, and fields N and N+2 are not detected as being repeated by unit 105, then fields N and N+1 are grouped as progressive and field N+2 becomes the new current field. However, if fields N and N+1 are detected as being progressive, and fields N and N+2 are detected as being repeated, then fields N and N+1 are grouped as being progressive, field N+2 is discarded and flied N+3 is set as the new current field.

Preferably, for all the sub-block measurements, each field is divided into 32 equal sub-blocks.

Figure 3:
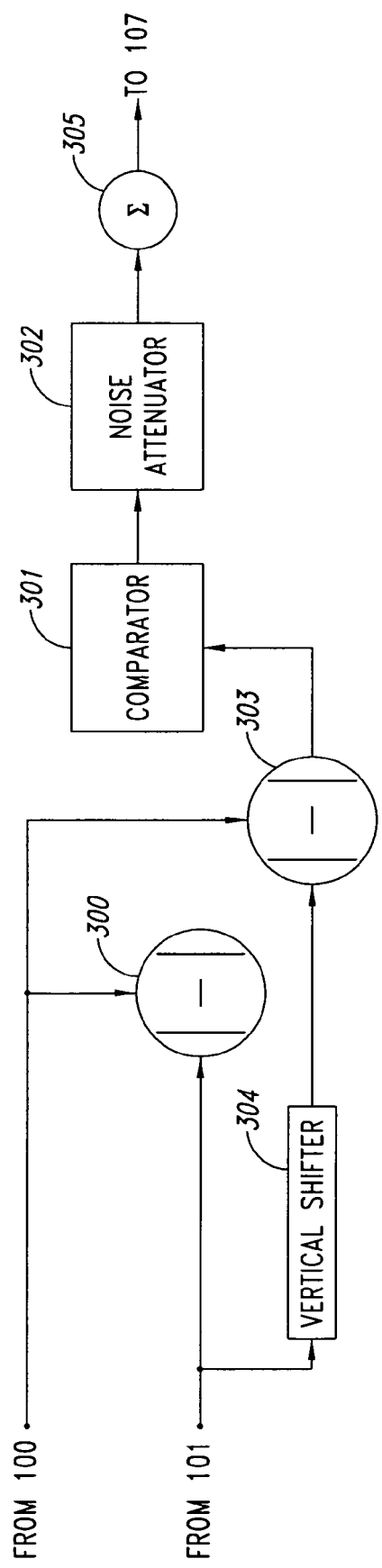
FIG. 3 is a block diagram of the consecutive field difference operation.
Figure 4:
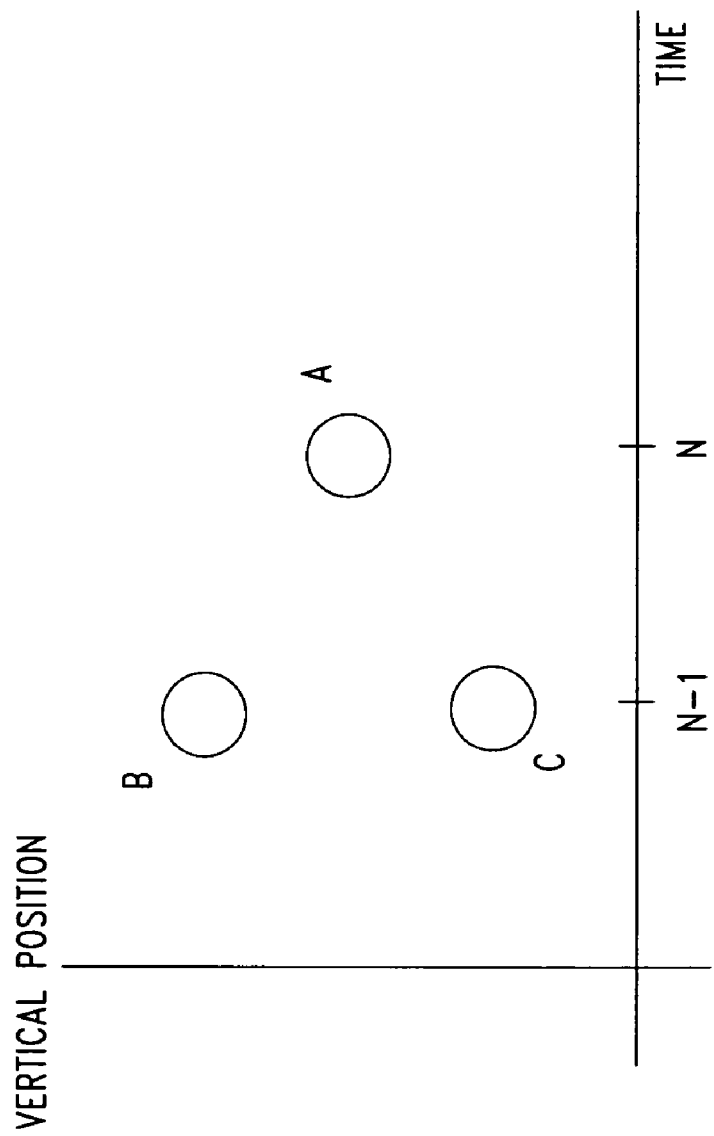
FIG. 4 is a spatio-temporal pixel diagram illustrating the consecutive field difference computation.

The block diagram of the consecutive field difference unit 106 is illustrated in FIG. 3. Subtractors 300 and 303 are used to compute the absolute pixel differences between fields N and N−1, and the smaller of the pixel differences is chosen by a comparator 301. The smaller pixel difference is then set to zero by noise attenuator 302 if it is less than a threshold $T_{noise}$, and each unattenuated pixel difference is accumulated in accumulator 305. This is illustrated in FIG. 4, where A is a pixel of the current field N and B and C are pixels from the previous field N−1 with vertical positions as shown. The pixel difference (PD) of pixel A is defined as the lesser of the absolute difference between A and B and the absolute difference between A and C, ie.

$$PD=\text{Min}(|A-B|, |A-C|)$$

The PD of every pixel in field N is computed and the values of PD less than $T_{noise}$ are regarded as noise and set to zero. The consecutive field difference CFD(N−1,N), of field $f_{N-1}$ and field $f_N$, is defined as the sum of all the PDs in field $f_N$. The reason for selecting the lesser of the two differences is that this will reduce inaccuracies in the calculation of the field differences arising from abnormal vertical displacement or horizontal edges. To decide whether field $f_N$ and $f_{N+1}$ are interlaced or progressive, the computation of the CFD(N−1, N) and CFD(N,N+1) is required.

The number of sub-block 'moving pixels' between fields $f_{N-1}$ and $f_{N+1}$ is also computed by the sub-block moving pixel counter 109 to find out if there is significant motion between fields $f_{N-1}$ and $f_{N+1}$. The moving-pixel(N−1,N+1) is defined as the pixel in each sub-block (preferably 32 sub-blocks per field) between field $f_{N-1}$ and $f_{N+1}$ with pixel-to-pixel difference greater than a threshold $T_{move}$.

Figure 5:
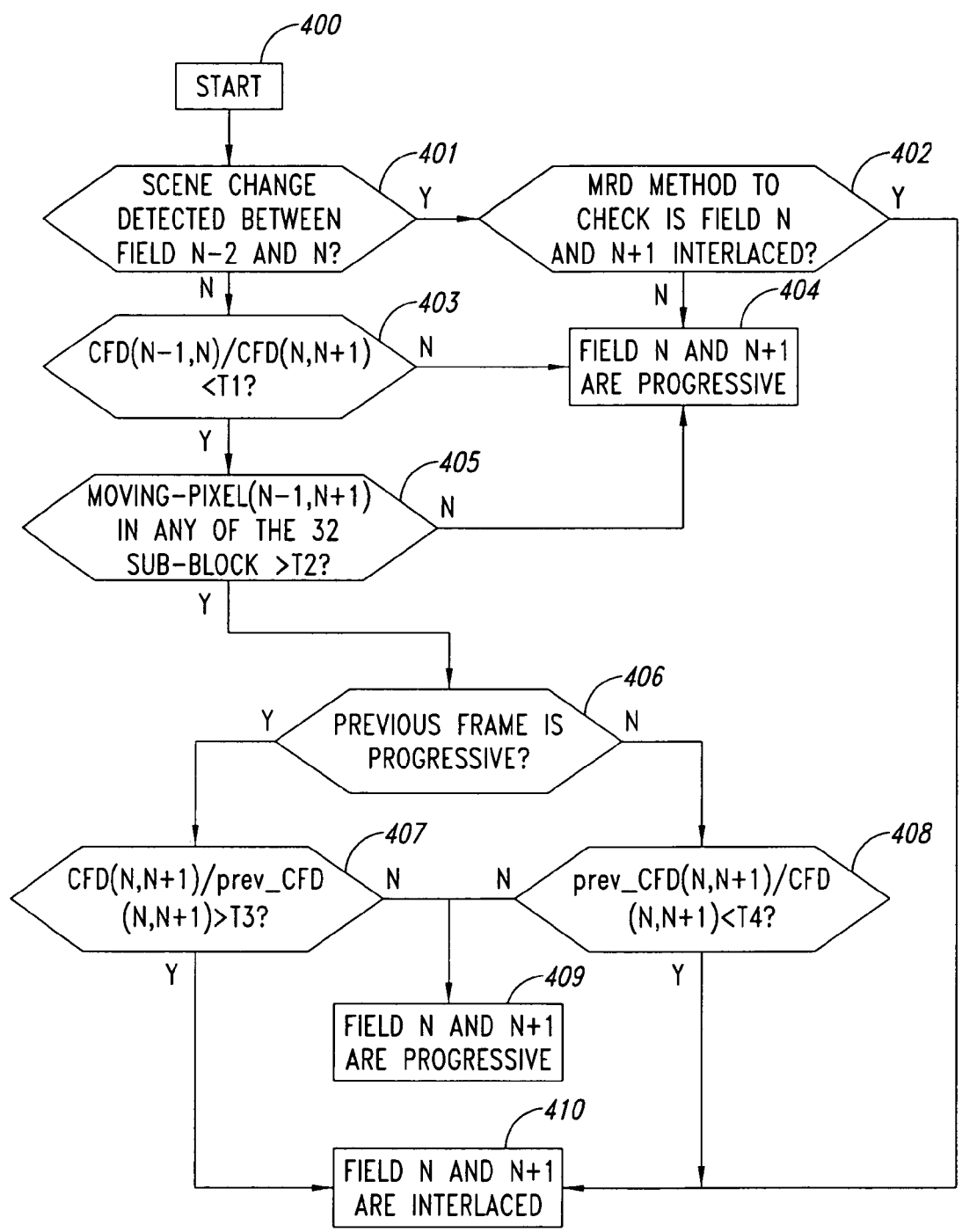
FIG. 5 is a flow diagram of the Interlace/progressive decision making algorithm.

A decision-making flow diagram is shown in FIG. 5. A ratio of CFD(N−1,N) to CFD(N, N+1) smaller than threshold T1 at step 403 indicates that fields $f_N$ and $f_{N+1}$ are interlaced, but to make sure that a small value of CFD(N−1,N) is not due to little or no motion, it is also required that the number of moving pixels between field $f_{N-1}$ and $f_{N+1}$ is more than threshold T2 in step 405. The decision at steps 407 and 408, as to whether the fields N and N+1 are progressive, also depends on the CFD computed for the previous frame during the decision. Prev_CFD(N,N+1) is the 'CFD(N,N+1)' computed for the previous frame (equivalent to either CFD(N−2,N−1) if the field $f_{N-1}$ is not a repeated field or CFD(N−3,N−2) if the field $f_{N-1}$ is detected as a repeated field). The two thresholds T3 and T4 are used to set the sensitivity of decision switching from progressive-to-interlace and interlace-to-progressive respectively (at steps 409 and 410). This is to avoid the problem of an interlaced sequence which has little or no motion switching the decision too frequently between interlace and progressive. Suitable values for $T_{noise}$, $T_{move}$, T1, T2, T3 and T4 have been found to be around 5, 30, 1.4, 100, 1.1 and 1.7 respectively.

If there is a scene change between $f_{N-2}$ and $f_N$ at step 401, then it may be meaningless to compare CFD(N−1,N) to CFD(N,N+1) as the scene change may occur between $f_{N-1}$ and $f_N$, causing the value of CFD(N−1,N) to be arbitrary. The decision can only be based on the information in fields $f_N$ and $f_{N+1}$. Therefore when there is a scene change detected (between current field $f_N$ and second previous field $f_{N-2}$), then the moving region detection (MRD) method is used at step 402. The MRD method detects any 'jagged region' or 'moving region' which is noticeable when two 'moving' consecutive fields are interlaced and viewed as a frame.

Figure 6:
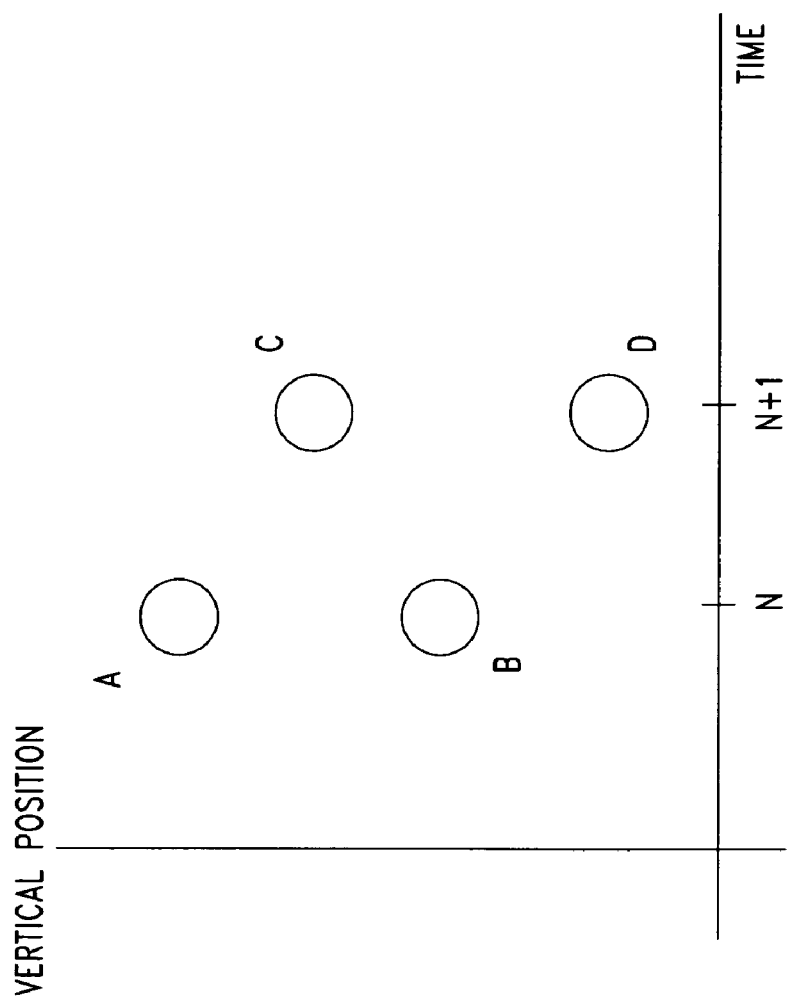
FIG. 6 is a spatio-temporal pixel diagram illustrating the moving region detection method.

Referring now to FIG. 6 (which illustrates the MRD method), A and B are pixels from field N and C and D are pixels from field N+1 with vertical positions as shown. If the absolute difference between A and C, B and C, and B and D are all greater than a threshold $T_{interlace}$ then the pair of pixels C and D are said to be 'interlaced pixels'. To decide whether the whole frame is interlaced, the detection is again preferably based on 32 sub-blocks. For each sub-block, if more than $T_{region}$ number of the above 'interlaced pixels' are detected, then the block is considered to be interlaced. If more than one block is found interlaced, then the frame is considered as interlaced.

Repeat field detection is performed on a pair of fields of the same parity (odd or even). The field similarity measurement is again preferably based on 32 sub-blocks in which the absolute sum of all the pixel-to-pixel differences of each block is accumulated in the accumulator 104. The repeat-field decision unit 105 operates as follows: The pixel differences for each sub-block difference (SBD) are compared to a threshold $T_{repeat}$, ie., SBD/(block_width×block_height)<$T_{repeat}$ for all sub-blocks If the pixel differences are smaller than $T_{repeat}$ for all 32 of the sub-blocks, then a repeat field is said to be detected and can be skipped for encoding by the field grouping decision unit 110. It should be noted that the repeated field detection is performed only when the incoming frame is detected as progressive by the interlace/progressive detection.

To prevent an incorrect consecutive repeat field being detected due to very little motion, the following algorithm is implemented:
If( (curr_decision=repeat-field) && (prev_decision1=repeat-field) && (prev_decision3=repeat-field) && (scene-change=No) )
then curr_decision=no-repeat-field
else if ( (curr_decision=repeat-field) && (prev_decision1=repeat-field) && (moving-pixel >35 in any one of the 32 sub-blocks) )
then curr_decision=no-repeat-field
where prev_decision1 is the first previous decision for repeat field detection and prev_decision3 is the third previous decision; scene-change is the scene change detection decision; and moving-pixel is the number of pixels with pixel difference greater than $T_{move}$ computed in the sub-block moving pixel counter 109. A suitable value for $T_{repeat}$ has been found to be around 2.5.

The differences between the current field and the previous field of the same parity are used to detect any significant change of scene. Making use of the sub-block difference (SBD), a simple thresholding method is employed by the scene change decision unit 108. Each block difference per pixel is compared with a threshold $T_{scene}$. If more than $T_{block}$ of the sub-blocks has its difference per pixel greater than $T_{scene}$, then a scene change is detected, ie.

SBD/(block_width×block_height)>$T_{scene}$ for more than $T_{block}$ sub-blocks

Apart from the above detection, a scene change is also detected by comparing the current field difference with the previous field difference to see if the current field difference has a sudden increment due to a scene change. The field difference (FD) is the sum of all the 32 absolute block differences. If the current field difference is more than $T_{ratio1}$ times greater than the previous field difference (prev_FD), then a scene change is said to be detected. The pseudocode of the scene change detection algorithm is as follows:
While (not end of sequence)
{
  For i=0 to 31,
  {
    If (SBD$_i$/(block_width×block_height)>$T_{scene}$) then
      count=count+1
    FD=FD+SBD$_1$
  }
  If (count>$T_{block}$) then
    scene-change is detected
  Else If (FD/prev_FD>$T_{ratio1}$) then
    scene-change is detected
  If ((prev_scene_change=Yes)||(prev_FD/FD<$T_{ratio2}$))
  then
    prev_FD=FD
  FD=0
  Increment to next frame
}

In a 3:2 pulldown film sequence, subtitles may be added to a repeated field, resulting in the field not being detected as a repeat field. When this particular field becomes the current field, the current FD computed (between the current field N and second previous field N−2) will have a small value (because of the small change due to the subtitles). Therefore, in updating the previous field difference (prev_FD), the condition 'prev_FD/FD<$T_{ratio}$' is to avoid updating a 'repeat field difference' which will affect the scene change decision made later.

The prev_scene-change is a scene change decision of a previous frame. When there is a scene change detected in the previous frame, then the condition 'prev_FD/FD<$T_{ratio2}$' might not be true due to the large value of prev-FD and hence the criteria 'prev_scene_change=Yes' will force an update of prev_FD. Suitable values for $T_{scene}$, $T_{block}$, $T_{ratio1}$ and $T_{ratio2}$ have been found to be about 15, 25, 2.5 and 3.0 respectively.

An advantage of embodiments of the present invention is to make accurate decisions as to whether a frame should be encoded as an interlace or progressive frame immediately after the second field of the frame is received. This enables the MPEG encoder to encode the frame as interlace or progressive accordingly accurately, including those odd interlaced frames within a film sequence due to editing or the odd progressive frames within an interlaced video sequence. In the above-described interlace/progressive determination method, apart from comparing the consecutive field differences, the moving activities between two successive frames is also computed to ensure that interlaced fields with little or no motion will not cause an incorrect decision. The present invention also addresses the situation where the scene change occurs in the current frame. The moving region detection method is then used for the interlace/progressive determination.

The invention claimed is:

1. A method of processing video data to detect field characteristics of the data, said data having a plurality of fields, comprising:

in a video processing apparatus,
calculating a first difference value as a difference between pixels of a first field and pixels of a second field, said first field being successive to said second field;
calculating a second difference value between the pixels of said first field and pixels of a third field, said third field being successive to said first field;
calculating a ratio between said first and second difference values;
comparing said ratio with a threshold;
determining whether said first field is an interlaced field or a progressive field with respect to said third field based on said steps of calculating, wherein the determining step includes determining whether said first field is an interlaced field or a progressive field based on said comparing step; and
calculating the number of moving pixels between said second and third fields, wherein the determining step includes determining that said first field is an interlaced field if said number is lower than a moving pixel threshold, and determining that said first and third fields are progressive if said number is not lower than the moving pixel threshold.

2. The method as claimed in claim 1, wherein said calculating steps include calculating absolute differences and accumulating said absolute pixel differences.

3. An apparatus for processing video data to detect field characteristics of the data, said data having a plurality of fields, comprising:

difference value calculating means for calculating a first difference value as a difference between pixels of a first field and pixels of a second field, said first field being a successive field of said second field, and calculating a second difference value between the pixels of said first field and pixels of a third field, said third field being a successive field of said first field;
progressive/interlace decision means for determining whether said first field is an interlaced field or a progressive field with respect to said third field based on the first and second difference values, wherein the difference value calculating means includes subtractor means for calculating absolute pixel differences and accumulator means for accumulating the absolute pixel differences, wherein said subtractor means comprises:
a first subtractor receiving a pixel of said first field and a first pixel of said second field and calculating a first pixel difference;
a second subtractor receiving said pixel of said first field and a second pixel of said second field and calculating a second pixel difference; and
a comparator selecting a smaller pixel difference between said first and second pixel differences, wherein the accumulator means accumulates said smaller pixel difference.

4. An apparatus according to claim 3, further comprising a noise attenuator arranged downstream of said comparator and setting to zero said smaller pixel difference if is less than a noise threshold.

5. An apparatus for processing video data to detect field characteristics of the data, said data having a plurality of fields, comprising:

difference value calculating means for calculating a first difference value as a difference between pixels of a first field and pixels of a second field, said first field being a successive field of said second field, and calculating a second difference value between the pixels of said first field and pixels of a third field, said third field being a successive field of said first field;
progressive/interlace decision means for determining whether said first field is an interlaced field or a progressive field with respect to said third field based on the first and second difference values;
input means;
a first field memory having an input connected to said input means and an output connected to said difference value calculating means, said difference value calculating means being also connected to said input means;
a second field memory connected to the output of said first field memory and having an output; and
a moving pixel counter having inputs connected to said input means and the output of said second field memory, and an output connected to said interlaced/progressive decision unit, said moving pixel counter counting moving pixels between said second and third fields and to obtain a count value of the moving pixels, wherein said progressive/interlace decision means includes means for comparing said count value of moving pixels with a moving pixel threshold, and means for defining said first and third fields as progressive if said count value of moving pixels is lower than said moving pixel threshold, and for defining said first and third fields as interlaced if said count value of moving pixels is not lower than said moving pixel threshold.

6. An apparatus according to claim 5, wherein said moving pixel counter comprises:

a subtractor having inputs connected to said input means and the output of said second field memory and calculating absolute differences between pixels present on said inputs of the subtractor; and
a sub-block moving pixel counter connected to an output of said subtractor.

7. An apparatus according to claim 6, further comprising:

a sub-block accumulator connected to the output of said subtractor;
a repeat field detection unit having an input connected to the output of said sub-block accumulator, and
a field grouping unit having first and second inputs respectively connected to the output of said repeat field detection unit and to the output of said progressive/interlace decision means.

8. An apparatus according to claim 7, further comprising a scene change detection unit having an input connected to said sub-block accumulator and an output connected to said progressive/interlace decision means; said progressive/interlace decision means including:

means for calculating a first difference between a first pixel in said first field and a second pixel in said third field;
means for calculating a second difference between a third pixel in said first field and said second pixel in said third field;

means for calculating a third difference between said third pixel in said first field and a fourth pixel in said third field; and means for determining said third and fourth pixels as interlaced if said first, second and third differences are greater than an interlace threshold.

9. A method of processing video data to detect field characteristics of the data, said data having a plurality of fields, comprising:

in a video processing apparatus,
calculating a first difference value as a difference between pixels of a first field and pixels of a second field, said first field being successive to said second field;
calculating a second difference value between the pixels of said first field and pixels of a third field, said third field being successive to said first field; and
determining whether said first field is an interlaced field or a progressive field with respect to said third field based on said steps of calculating, wherein said step of calculating a first difference value comprises for each of a plurality of the pixels of said first field:
calculating pixel differences between the pixel of said first field and two pixels of said second field;
selecting a smaller pixel difference between said pixel differences; and
accumulating said smaller pixel difference.

10. A method according to claim 9, wherein, before accumulating, said smaller pixel difference is set to zero if said smaller pixel difference is less than a noise threshold.

11. A method according to claim 1, further comprising verifying whether a scene-change has occurred before performing said calculating steps.

12. A method of processing video data to detect field characteristics of the data, said data having a plurality of fields, comprising:

in a video processing apparatus,
calculating a first difference value as a difference between pixels of a first field and pixels of a second field, said first field being successive to said second field;
calculating a second difference value between the pixels of said first field and pixels of a third field, said third field being successive to said first field;
determining whether said first field is an interlaced field or a progressive field with respect to said third field based on said steps of calculating; and
verifying whether a scene-change has occurred before performing said calculating steps, wherein if said step of verifying reveals that a scene-change has occurred, then the method includes performing a moving pixel detection by:
calculating a first difference between a first pixel in said first field and a second pixel in said third field;
calculating a second difference between a third pixel in said first field and said second pixel in said third field;
calculating a third difference between said third pixel in said first field and a fourth pixel in said third field;
determining said third and fourth pixels as interlaced if said first, second, and third differences are greater than an interlace threshold; and
for each of a plurality of sub-blocks of said first and third fields, detecting a moving region by repeating said moving pixel detection for pixels of the sub-block; if the number of interlaced pixels in said sub-block is higher than a region threshold said sub-block is considered interlaced; and, if more than one sub-block is found interlaced, then said first and third fields are considered interlaced.

13. A method according to claim 1, further comprising, if said first and third fields are interlaced, then grouping said first and third fields and setting a fourth field, successive to said third field, as current first field.

14. A method according to claim 1, wherein, if said first and third fields are not interlaced, then checking if a fourth field, successive to said third field, is repeating said first field, if so, then:
grouping said first and third fields;
dropping said fourth field; and
setting a fifth field, successive to said fourth field, as current first field, and if the fourth field is not repeating said first field, then:
grouping said first and third fields; and
setting said fourth field as current first field.

15. A method of processing video data to detect field characteristics of the data, the data having first, second, and third fields in which the third field is successive to the first field which is successive to the second field, the method comprising:

in a video processing apparatus,
determining, for each of a plurality of pixels of the third field, whether the pixel is a moving pixel by:
calculating a difference between a value of the pixel and a value of a pixel in the second field having a position that is the same as a position of the pixel of the third field; and
determining whether the calculated difference is greater than a moving threshold;
calculating a moving pixel count value that indicates how many pixels of the third field are determining to be moving pixels;
determining whether the pixel count value is less than a moving pixel count threshold; and
determining whether the first field is an interlaced field or a progressive field with respect to the third field based on whether the pixel count value is less than the moving pixel count threshold.

16. The method of claim 15, further comprising:
calculating a first difference value as a difference between pixels of the first field and pixels of the second field; and
calculating a second difference value between the pixels of the first field and pixels of the third field, wherein determining whether the first field is an interlaced field or a progressive field is also based on the first and second difference values.

17. The method of claim 16, further comprising:
calculating a ratio between the first and second difference values; and
comparing the ratio with a threshold, wherein determining whether the first field is an interlaced field or a progressive field is based on the comparing step.

18. The method of claim 16, wherein the step of calculating a first difference value comprises for each of a plurality of the pixels of the first field:
calculating pixel differences between the pixel of the first field and two pixels of the second field;
selecting a smaller pixel difference between the pixel differences; and
accumulating the smaller pixel difference.

19. The method of claim 15, further comprising:
verifying whether a scene-change has occurred before performing the determining and calculating steps;

if the step of verifying reveals that a scene-change has occurred, then performing a moving pixel detection by:
calculating a first difference between a first pixel in the first field and a second pixel in the third field;
calculating a second difference between a third pixel in the first field and the second pixel in the third field;
calculating a third difference between the third pixel in the first field and a fourth pixel in the third field; and
determining that the third and fourth pixels are interlaced if the first, second, and third differences are greater than an interlace threshold.

20. The method of claim 19, further comprising, for each of a plurality of sub-blocks of the first and third fields:

detecting a moving region by repeating the moving pixel detection for pixels of the sub-block; if the number of interlaced pixels in the sub-block is higher than a region threshold the sub-block is considered interlaced; and, if more than one sub-block is found interlaced, then the first and third fields are considered interlaced.

\* \* \* \* \*